(12) United States Patent
Kim et al.

(10) Patent No.: US 8,808,916 B2
(45) Date of Patent: Aug. 19, 2014

(54) CATHODE ACTIVE MATERIAL FOR LITHIUM SECONDARY BATTERIES, METHOD FOR PREPARING THE SAME, AND LITHIUM SECONDARY BATTERIES COMPRISING THE SAME

(75) Inventors: Seong-Bae Kim, Incheon (KR); Woo-Seong Kim, Gyeonggi-do (KR); Ki-Sup Song, Seoul (KR); Ji-Jun Hong, Seoul (KR); Sung-Tae Ko, Chungcheongnam-do (KR); Yoon-Jeong Heo, Chungcheongnam-do (KR)

(73) Assignees: Daejung EM Co., Ltd., Incheon (KR); Kokam Co., Ltd., Siheung, Gyeonggki-Do (KR)

( * ) Notice: Subject to any disclaimer, the term of this patent is extended or adjusted under 35 U.S.C. 154(b) by 695 days.

(21) Appl. No.: 12/626,300

(22) Filed: Nov. 25, 2009

(65) Prior Publication Data

US 2011/0052991 A1   Mar. 3, 2011

Related U.S. Application Data

(63) Continuation of application No. PCT/KR2009/004912, filed on Sep. 1, 2009.

(30) Foreign Application Priority Data

Aug. 28, 2009   (KR) .................. 10-2009-0080663

(51) Int. Cl.
*H01M 4/58* (2010.01)
*H01M 4/48* (2010.01)

(52) U.S. Cl.
USPC ............... 429/231.1; 429/231.95; 429/231; 429/231.6; 429/231.5; 427/126.1

(58) Field of Classification Search
USPC ........ 429/231.1, 231.3, 231.2, 231.95, 231.5, 429/231.6, 224, 223; 427/126.1, 216, 427/126.3, 217; 423/305, 304; 428/689, 428/697, 403
See application file for complete search history.

(56) References Cited

U.S. PATENT DOCUMENTS

| | | | |
|---|---|---|---|
| 2008/0292953 A1* | 11/2008 | Hosaka et al. | 429/163 |
| 2010/0203388 A1 | 8/2010 | Kim et al. | |
| 2010/0261071 A1* | 10/2010 | Lopatin et al. | 429/345 |

FOREIGN PATENT DOCUMENTS

| | | |
|---|---|---|
| JP | 2001-143705 A | 5/2001 |
| JP | 2002-143708 A | 5/2002 |
| JP | 2006-019229 A | 1/2006 |
| JP | 2007-012441 A | 1/2007 |
| KR | 10-2009-0008870 | 1/2009 |
| KR | 10-0889451 | 3/2009 |

* cited by examiner

*Primary Examiner* — Raymond Alejandro
(74) *Attorney, Agent, or Firm* — Edwards Wildman Palmer LLP; Kongsik Kim

(57) ABSTRACT

Disclosed are a cathode active material for lithium secondary batteries, a method for preparing the same, and lithium secondary batteries comprising the same. The cathode active material for lithium secondary batteries comprises a lithium metal oxide secondary particle core formed by aggregation of a plurality of lithium metal oxide primary particles; a first shell formed by coating the surface of the secondary particle core with a plurality of barium titanate particles and a plurality of metal oxide particles; and a second shell formed by coating the surface of the first shell with a plurality of olivine-type lithium iron phosphate oxide particles and a plurality of conductive material particles. The cathode active material for lithium secondary batteries allows manufacture of lithium secondary batteries having excellent thermal stability, high-temperature durability and overcharge safety.

4 Claims, 5 Drawing Sheets

(a)

(b)

(c)

(d)

CATHODE ACTIVE MATERIAL FOR LITHIUM SECONDARY BATTERIES, METHOD FOR PREPARING THE SAME, AND LITHIUM SECONDARY BATTERIES COMPRISING THE SAME

CROSS-REFERENCE TO RELATED APPLICATIONS

The is a continuation of PCT/KR2009/004912 filed on Sep. 1, 2009, which claims priority to Korean Patent Application No. 10-2009-0080663 filed on Aug. 28, 2009, the entire contents of which are incorporated herein by reference.

TECHNICAL FIELD

The present invention relates to a cathode active material for lithium secondary batteries, a method for preparing the same and lithium secondary batteries comprising the same. In particular, the present invention relates to a cathode active material for lithium ion polymer batteries that has the improved safety, especially thermal stability, high-temperature durability and overcharge safety, and a method for preparing the same.

BACKGROUND ART

With rapid development of electronics, communications and computer industries, portable electronic communication equipments such as camcorders, mobile phones, notebook PCs (Personal Computers) or the like have been remarkably developed. Consequently, as a power source for driving these portable electronic communication equipments, the demand for lithium secondary batteries is increasing day by day. In particular, in application of electric vehicles, uninterruptible power supplies, motor tools or artificial satellites, research and development of the lithium secondary batteries as an environmentally friendly power source is lively made inside and outside of the country including Japan, Europe and U.S.A. As commercialization of the lithium secondary batteries is expanded, the lithium secondary batteries are studied in the field of high capacity and safety.

Conventionally, lithium cobalt oxide ($LiCoO_2$) was mainly used as a cathode active material for the lithium secondary batteries, however currently other layered cathode active materials are also used, for example, lithium nickel oxide (Li(Ni—Co—Al)$O_2$), lithium composite metal oxide (Li(Ni—Co—Mn)$O_2$) and so on. In addition, attention is given to a low-costly and highly safe spinel-type lithium manganese oxide ($LiMn_2O_4$) and an olivine-type lithium iron phosphate compound ($LiFePO_4$).

However, lithium secondary batteries using the lithium cobalt oxide, lithium nickel oxide or lithium composite metal oxide have excellent basic battery characteristics, but insufficient safety, especially thermal stability and overcharge characteristics. To solve this problem, various safety mechanism has been introduced, for example, a shut-down function of a separator, an additive of an electrolyte, a safety device such as a protection circuit or a PTC (Positive Temperature Coefficient) device, however said mechanism was designed under such conditions that the filling capability of a cathode active material is not too high. Thus, when the filling capability of a cathode active material is increased to meet the demand for high capacity, it causes insufficient operation of said safety mechanism and deterioration of safety.

And, lithium secondary batteries using the spinel-type lithium manganese oxide were once applied to mobile phones, but the batteries did not meet the demand for high energy density in the mobile phone market pursuing advanced function, and thus, had no chance to prove their merits of low cost and high safety. Recently, the spinel-type lithium manganese oxide get attention as a cathode active material for lithium secondary batteries. However, the spinel-type lithium manganese oxide does not meet the demand for high energy density due to its low electrical capacity.

The olivine-type lithium iron phosphate compound has advantages of low cost and high safety, but makes it difficult to expect excellent battery characteristics due to its very low electronic conductivity, and does not meet the demand for high capacity due to its low average operating potential.

Accordingly, various studies have been made to solve the above-mentioned problems, but an effective solution has not been suggested to date.

For example, Japanese Laid-open Patent Publication No. 2001-143705 discloses a cathode active material, in which lithium cobalt oxide and lithium manganese oxide are mixed. However, this prior art simply involves mixing with lithium manganese oxide having excellent safety, and shows an insufficient safety improvement.

And, Japanese Laid-open Patent Publication No. 2002-143708 suggests a cathode active material containing a two-layered lithium nickel composite oxide of different compositions, however this prior art does not fundamentally show sufficient safety improvement after overcharge due to the two-layered lithium nickel composite oxide of different compositions.

Japanese Laid-open Patent Publication No. 2007-012441 discloses a battery comprising a cathode having at least two-layered cathode active material layer so as to improve overcharge characteristics, and suggests the use of olivine-type lithium iron phosphate oxide or spinel-type lithium manganese oxide as a cathode active material layer adjacent to a cathode current collector. The overcharge characteristics improvement is expected, however as it is difficult to form the oxide layers with a thickness below an average particle size, the oxide layers have a thickness of about several μm. Furthermore, the cathode active material of this prior art does not contain a conductive material or a conductive additive, and thus is considered to have insufficient high-current discharge characteristics.

Meanwhile, Japanese Laid-open Patent Publication No. 2006-19229 suggests surface-coating secondary particles of lithium nickel oxide with lithium cobalt zirconium oxide to improve the poor safety of the lithium nickel oxide. However, a wet coating process is used to surface-coat the secondary particles of lithium nickel oxide with the lithium cobalt zirconium oxide, and thus safety is remarkably improved, but productivity is limitative.

Therefore, there is an urgent need for a cathode active material having high safety as well as excellent battery characteristics, and a method of preparing the cathode active material with excellent productivity.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Therefore, it is an object of the invention to provide a cathode active material that is capable of remarkably improving safety, especially thermal stability, high-temperature durability and overcharge characteristics while not deteriorating basic battery characteristics, and a method of preparing the cathode active material with excellent reproducibility and productivity.

In order to achieve the object, a cathode active material for lithium secondary batteries comprises a lithium metal oxide secondary particle core formed by aggregation of a plurality of lithium metal oxide primary particles; a first shell formed by coating the surface of the secondary particle core with a plurality of barium titanate particles and a plurality of metal oxide particles; and a second shell formed by coating the surface of the first shell with a plurality of olivine-type lithium iron phosphate particles and a plurality of conductive material particles.

Specifically, the cathode active material has a first shell containing barium titanate particles and metal oxide particles, and thus can improve thermal stability and high-temperature durability while favorably maintaining electrical characteristics. More specifically, the first shell containing barium titanate and metal oxide prevents the contact between the core and an electrolyte to suppress heat generation caused by a side reaction of the electrolyte, thereby improving thermal stability and high-temperature durability. In particular, barium titanate changes its crystal structure in the vicinity of about 125° C. and increases the electrical resistance. The inventors introduced barium titanate having these characteristics to a cathode active material, and found that thermal stability of the cathode active material was improved. And, the metal oxide of the first shell may improve various characteristics of the cathode active material depending on its type.

And, the cathode active material of the present invention has the second shell including olivine-type lithium iron phosphate particles and conductive material particles on the surface of the first shell, and thus can improve overcharge safety and discharge characteristics.

As mentioned above, the cathode active material of the present invention has a double coating layer structure of the first shell and the second shell. The inventors found that this feature does not hamper the characteristics improvement effect of each shell, but takes a remarkable synergy effect.

And, in order to achieve the object, a method for preparing a cathode active material for lithium secondary batteries comprises (S1) forming a lithium metal oxide secondary particle core, in which a plurality of lithium metal oxide primary particles are aggregated, by sintering metal hydroxide and a lithium salt; (S2) forming a first shell outside of the core by dry-coating the surface of the core with a plurality of barium titanate particles and a plurality of metal oxide particles and performing thermal treatment thereto; and (S3) forming a second shell by dry-coating the surface of the first shell with a plurality of olivine-type lithium iron phosphate particles and a plurality of conductive material particles and performing thermal treatment thereto.

The method for preparing a cathode active material for lithium secondary batteries according to the present invention uses a dry-coating process for effective coating with excellent producibility, and improves the powder characteristics of the cathode active material and consequently the electrical characteristics of a cathode manufactured from the cathode active material.

The cathode active material for lithium secondary batteries according to the present invention can be applied to a cathode of lithium secondary batteries and lithium secondary batteries comprising the cathode.

BRIEF DESCRIPTION OF THE DRAWINGS

These and other features, aspects, and advantages of preferred embodiments of the present invention will be more fully described in the following detailed description, taken accompanying drawings.

DETAILED DESCRIPTION

Figure 1A:
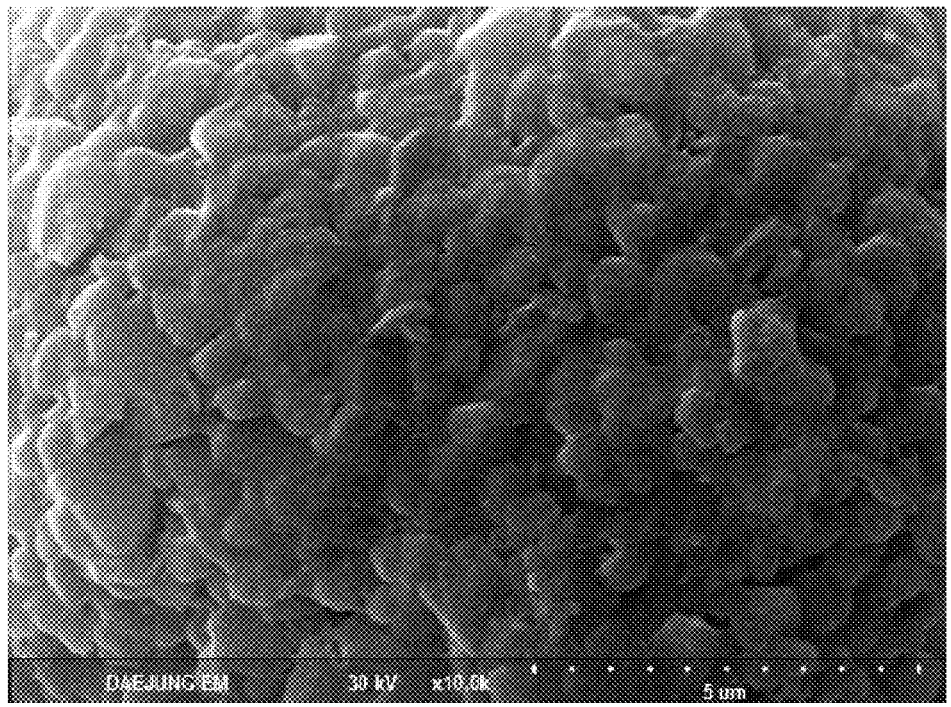
FIG. 1 is an SEM image of a cathode active material of example 1 according to the present invention (a: a core cathode active material, b: a first cathode active material, c: a second cathode active material).

Hereinafter, the present invention will be described in detail with reference to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

First, metal hydroxide and a lithium salt are sintered to form a lithium metal oxide secondary particle core, in which lithium metal oxide primary particles are aggregated (S1).

The lithium metal oxide usable in the present invention may include, without limitation, all oxides except olivine-type lithium iron phosphate oxide, if it is used as a cathode active material for lithium secondary batteries in the prior art. For example, the lithium metal oxide may be any one selected from the group consisting of $LiCoO_2$, $Li(Ni_aCo_bAl_c)O_2$ (0<a<1, 0<b<1, 0<c<1, a+b+c=1), $Li(Ni_aCo_bMn_c)O_2$ (0<a<1, 0<b<1, 0<c<1, a+b+c=1), $Li(Li_xNi_aCo_bMn_c)O_2$ (0<x<0.5, 0<a<1, 0<b<1, 0<c<1, a+b+c=1) and $LiMn_2O_4$, or mixtures thereof, however the present invention is not limited in this regard.

The lithium metal oxide secondary particle core of the present invention is formed by aggregation of lithium metal oxide primary particles, and is made by sintering metal hydroxide and a lithium salt. A method for producing metal hydroxide is described in detail as follows.

Various processes used to produce metal hydroxide are well known in the art, and the present invention cites coprecipitation as an instance. The metal hydroxide includes corresponding raw materials depending on the type of a cathode active material. As an essential raw material, metal salts may be sulfate, nitrate, acetate and so on. An aqueous solution containing such a metal salt is continuously added under coprecipitation conditions to continuously obtain a slurry containing metal hydroxide. Then, the slurry is washed, filtered and dried to produce metal hydroxide.

If the metal hydroxide is used to prepare lithium metal oxide as mentioned above, it is possible to prevent invasion of impurities contained in metal salts, control the size of elements to a level of atom, maximizing the effects of different elements added in small amounts, and easily prepare lithium metal oxide having a uniform crystal structure, almost free of impurities.

The metal hydroxide produced from a raw material precursor by a hydroxide coprecipitation technique as mentioned above is thermally treated at a predetermined temperature and mixed with various lithium salts for a desired composition. The mixture is sintered under typical sintering conditions to prepare lithium metal oxide of the present invention. The prepared lithium metal oxide is obtained as a lithium metal oxide secondary particle, in which lithium metal oxide primary particles are aggregated. An average particle size of the primary particle in the secondary particle may vary depending on coprecipitation conditions, sintering conditions and so on, determined according to a composition ratio of the metal hydroxide, and the present invention is not limited to a specific average particle size range of the primary particle.

And, an average particle size of the secondary particle may vary depending on the purpose of use, preparation environment and so on, and may be, for example, 7 to 15 μm (micrometer), however the present invention is not limited in this regard. When the average particle size of the secondary particle is in this range, stability of the secondary particle is improved during a subsequent dry coating process of metal oxide and barium titanate, and efficiency and reproducibility of the coating process are improved.

The secondary particle is not limited to a specific shape, however, when the secondary particle is spherical, efficiency of a coating process may be further improved, by which the secondary particle is surface-coated with first and second shells.

Next, the core is dry-coated with a plurality of barium titanate particles and a plurality of metal oxide particles and thermally treated to form a first shell outside of the core (S2).

In the present invention, the barium titanate particles and the metal oxide particles of the first shell have a smaller average particle size than olivine-type lithium iron phosphate particles and conductive material particles used to form a second shell to be described below, and thus, the first shell can block an electrolyte more faithfully that was not sufficiently blocked by the second shell, and effectively suppress a side reaction of the electrolyte.

The term "barium titanate" used in the present invention includes pure barium titanate and barium titanate added with a small amount (0.1 to 1.5 weight %) of La, Ce, Nd, Pr, Sm, Gd, Nb, Bi, Sb, Ta and so on. The barium titanate has high dielectricity, and is a positive temperature coefficient (PTC) thermistor, of which resistance increases as temperature rises. The barium titanate of the present invention coats the core to suppress a side reaction of an electrolyte, and remarkably increases the electrical resistance by changing its crystal structure in the vicinity of about 125° C. as mentioned above. Accordingly, when high temperature occurs in a battery, for example, the battery is placed in a high temperature environment or an over-current occurs due to an internal short circuit, the barium titanate acts as resistance against the flow of electrons to improve thermal stability and high-temperature durability of the cathode active material.

An average particle size of the barium titanate used in the present invention may vary depending on the purpose of use, preparation environment and so on, however the average particle size of the barium titanate is preferably 1 μm (micrometer) or less to suit the object of the present invention. As the average particle size of the barium titanate becomes smaller than 1 μm (micrometer), the efficiency of a dry coating process increases. Thus, the present invention is not limited to a specific minimum of the average particle size of the barium titanate. For example, the barium titanate may have an average particle size of 1 nm, however the present invention is not limited in this regard. If the average particle size of the barium titanate is more than 1 μm (micrometer), it causes reduction in the efficiency and reproducibility of a coating process, by which the lithium metal oxide of the core is surface-coated. Thus, a sufficient specific surface area of a coating material (a first shell forming material) is essential to coat the surface of the core, i.e., an object to be coated, in the form of a film by a dry coating process. In other words, if the average particle size of the barium titanate is more than 1 μm (micrometer), a ratio of barium titanate involved in coating to the whole barium titanate decreases, and barium titanate not involved in coating simply remains mixed.

The content of the barium titanate according to the present invention may be properly determined depending on the type of a battery using a cathode active material. For example, the content of the barium titanate may be 0.05 to 1 part by weight based on 100 parts by weight of the core, however the present invention is not limited in this regard. If the content of the barium titanate is less than 0.05 parts by weight, the usage effect of the barium titanate is negligible. If the content of the barium titanate is more than 1 part by weight, the specific capacity of the cathode active material may reduce due to the increased content of the barium titanate.

And, the core of the present invention is coated with metal oxide as well as the barium titanate to form a first shell. The metal oxide serves as a binder for strengthening the bond between the core and the barium titanate to prevent a direct contact between the core and an electrolyte, thereby improving thermal stability and high-temperature durability. And, the metal oxide directly affects sphericity and disintegration of the core. The metal oxide can improve various characteristics of the cathode active material or give additional characteristics depending on its type.

For example, if the metal oxide is aluminium oxide ($Al_2O_3$), although capacity of a battery reduces slightly, improvement in high-temperature characteristics and powder characteristics. And, it is known that the similar results are obtained for metal oxides such as titanium oxide ($TiO_2$), yttrium oxide ($Y_2O_3$), magnesium oxide (MgO), zinc oxide (ZnO) and so on.

And, the metal oxide of the present invention may further include lithium metal oxide. In this case, it is expected to improve rapid charge/discharge characteristics or cycleability without reduction in capacity of a battery. The lithium metal oxide may include various lithium metal oxides, for example, layered lithium composite metal oxide, lithium cobalt oxide, spinel-type lithium manganese oxide and so on.

However, the metal oxide applied to the first shell is not limited in this regard, and may include a combination of various types of nano metal oxides to improve its function, i.e., safety, high-temperature characteristics and conductivity after applied to the first shell.

An average particle size of the metal oxide used in the present invention may vary depending on the purpose of use, preparation environment and so on. For example, the average particle size of the metal oxide may be 1 to 100 nm, however the present invention is not limited in this regard. When the average particle size of the metal oxide is in this range, it results in excellent productivity, the capacity reduction of a battery is prevented to the maximum, and the first shell formation effect is maximized. Specifically, the smaller the average particle size of the metal oxide, the specific surface area of metal oxide involved in coating increases. Thus, the first shell can be formed with a small amount of metal oxide and the first shell formation effect is maximized. If the average particle size of the metal oxide is less than 1 nm, as it is not easy to obtain such metal oxide, the cost required to prepare a core-shell cathode active material may increase. If the average particle size of the metal oxide is more than 100 nm, as the specific surface area of the metal oxide decreases, the required amount of metal oxide increases to coat the first shell in the form of a film and the capacity of a battery decreases. Preferably, the metal oxide of the present invention may have such an average particle size that the metal oxide particles are disposed in the gap between the barium titanate particles. In this case, as the metal oxide particles can fill the gap between the barium titanate particles, the first shell can have a denser structure and the function of the metal oxide as a binder can be maximized.

Generally, a coating method used to prepare the core-shell cathode active material of the present invention includes a wet coating method and a dry coating method. Conventionally, the wet coating method has been mainly used for uniform dispersion of a coating material. The wet coating method sprays or impregnates onto a cathode active material a dispersant or suspension, in which a coating material is dispersed or an organic solution or aqueous solution, in which a coating material is dissolved, and dries the coated cathode active material.

However, the wet coating method has limitations in coating the cathode active material in the form of a film. In the case that a coating solution using water as a solvent is applied, the wet coating method removes a conductive passive film that is formed on the surface of the cathode active material as a lithium salt. As a result, the conductivity of the cathode active material itself decreases, and drying and grinding are required additionally, limiting mass production.

On the contrary, the dry coating method used in the present invention surface-coats the cathode active material corresponding to a core with a coating material corresponding to a shell in a mechanical manner. In this case, a shear force, a collision force and a compression force exhibit according to the equipment used for coating.

Generally, because the cathode active material obtained by sintering metal hydroxide as a raw material precursor and lithium at a high temperature involves sintering at a high temperature by the hydroxide raw material precursor having a relatively low sphericity or the excess of lithium, grinding and classification is required. Conventionally, it was substantially impossible to grind the cathode active material to the average particle size of the metal hydroxide as the raw material precursor, while maintaining sphericity.

However, coating by a mechanical method according to the present invention ensures both sphericity and disintegration of the core by virtue of the nano metal oxide corresponding to a shell, thereby improving powder characteristics of the cathode active material and consequently the electrical characteristics.

After coating for forming the first shell is completed, thermal treatment starts. The thermal treatment after coating gets rid of stress occurred to individual particles due to sintering and mechanical dry-coating, thereby preventing deterioration in the specific capacity or powder conductivity caused by coating with the barium titanate and the metal oxide that are electrically inactive. Thermal treatment conditions may be properly selected depending on the preparation environment such as type of the cathode active material of the core. For example, thermal treatment may be performed at 300 to 600° C. for 4 to 12 hours, however the present invention is not limited in this regard. When the thermal treatment temperature is in this range, the shell has a very dense structure, and can sufficiently supplement the crystal structure deficiency of the core and stably maintain the structure of the core. When the thermal treatment time is in this range, the thermal treatment effect may be sufficiently obtained. If the thermal treatment time exceeds 12 hours, an additional effect of the increased thermal treatment time may not be expected.

Subsequently, the surface of the first shell is dry-coated with a plurality of olivine-type lithium iron phosphate particles and a plurality of conductive material particles, and thermally treated to form a second shell (S3).

In the core-shell cathode active material of the present invention, the olivine-type lithium iron phosphate particles and the conductive material particles are preferred as a second shell forming material coated on the first shell. The olivine-type lithium iron phosphate has lower hardness than the barium titanate or the metal oxide of the first shell. For this reason, if the olivine-type lithium iron phosphate is used to form a first shell in place of the barium titanate or the metal oxide and the barium titanate or the metal oxide is used to form a second shell in place of the olivine-type lithium iron phosphate, the olivine-type lithium iron phosphate cannot endure a coating process with the barium titanate or the metal oxide for forming the second shell, and may generate fine powder or be separated from the core. As a result, the present invention cannot obtain the desired effect. Accordingly, preferably a coating process with olivine-type lithium iron phosphate follows a coating process with barium titanate or metal oxide.

In the present invention, the second shell formed from the olivine-type lithium iron phosphate particles and the conductive material particles primarily blocks the contact between the core and an electrolyte. And, the olivine-type lithium iron phosphate is said to have a highest resistance increase rate during overcharge. Thus, an amount of lithium discharged from the cathode active material of the core is limited, and consequently, an amount of lithium deposited on a cathode is reduced and an amount of heat generated by a reaction with an electrolyte is reduced, thereby improving safety, in particular, during overcharge.

An average particle size of the olivine-type lithium iron phosphate used in the present invention may vary depending on the purpose of use, preparation environment and so on. Preferably, the average particle size of the olivine-type lithium iron phosphate may be 1 μm (micrometer) or less. As the average particle size of the olivine-type lithium iron phosphate becomes smaller than 1 μm (micrometer), the efficiency of the dry coating process according to the present invention increases. Thus, the present invention is not limited to a specific minimum limit of the average particle size of the olivine-type lithium iron phosphate. Preferably, the average particle size of the olivine-type lithium iron phosphate is 500 nm or less. For example, the average particle size of the olivine-type lithium iron phosphate may be 1 nm, however the present invention is not limited in this regard. If the average particle size of the olivine-type lithium iron phosphate is more than 1 μm (micrometer), it results in deterioration in the efficiency and reproducibility of a surface-coating process of the core-shell cathode active material having the first shell. Thus, a sufficient specific surface area of a second shell forming material is essential to coat the surface of the core-shell cathode active material having the first shell, i.e., an object to be coated, in the form of a film by a dry coating process. In other words, if the average particle size of the olivine-type lithium iron phosphate is more than 1 μm (micrometer), a ratio of olivine-type lithium iron phosphate particles involved in coating to the whole olivine-type lithium iron phosphate particles decreases, and olivine-type lithium iron phosphate particles simply remain mixed.

The content of the olivine-type lithium iron phosphate of the second shell according to the present invention may be properly determined depending on the type of a battery using a cathode active material. For example, the content of the olivine-type lithium iron phosphate may be 0.05 to 5 part by weight based on 100 parts by weight of the core, however the present invention is not limited in this regard. If the content of the olivine-type lithium iron phosphate is less than 0.05 parts by weight, the usage effect of the olivine-type lithium iron phosphate is negligible. If the content of the olivine-type lithium iron phosphate is more than 5 parts by weight, an amount of olivine-type lithium iron phosphate not involved in coating but simply remaining mixed increases to bring about a reverse effect such as a reduction in average discharge voltage.

Meanwhile, the olivine-type lithium iron phosphate has a very low conductivity, and when used as an active material, the capacity of a battery reduces, making commercialization difficult. And, the electrically inactive first shell forming material of the present invention causes an increase in powder characteristics. To solve these problems, the present invention additionally introduces a conductive material to the shell, thereby preventing the capacity decrease of a battery caused by use of the olivine-type lithium iron phosphate and favorably maintaining the electrical characteristics of the cathode active material. And, although the conductive material is introduced to the second shell, the lithium ion blocking effect of the olivine-type lithium iron phosphate does not substantially reduce. Thus, even though the conductive material is introduced, the cathode active material does not have a reduction in stability, but improvement in electrical characteristics.

The conductive material of the present invention may include conductive metals, conductive polymers, conductive carbon and so on. The conductive carbon may include, for example, carbon nano tube, Ketjen black, acetylene black, Super-P, graphite, activated carbon and so on, however the present invention is not limited in this regard. The conductive material preferably has an average particle size of 1 μm (micrometer) or less. As the average particle size of the conductive material becomes smaller than 1 μm (micrometer), the specific surface area of the conductive material increases, and consequently, an amount of added conductive material decreases. Thus, the present invention is not limited to a specific minimum limit of the average particle size of the conductive material. For example, the conductive material may have an average particle size of 1 nm, however the present invention is not limited in this regard. If the average particle size of the conductive material is larger than 1 μm (micrometer), the conductive material has difficulty in forming a second shell with other second shell forming materials due to its large size. And, the average particle size of the conductive material may be similar to that of the olivine-type lithium iron phosphate that is introduced at the same time with the conductive material. In particular, in the case that conductive carbon is used as the conductive material, the conductive carbon may suffer particle deformation or breakage during a coating process. Accordingly, an initial average particle size of the conductive material is preferably larger than the average particle size of the olivine-type lithium iron phosphate.

The content of the conductive material of the second shell according to the present invention may be properly selected according to the type of a battery using a cathode active material. For example, the content of the conductive material may be 0.1 parts by weight or more based on 100 parts by weight of the core, however the present invention is not limited in this regard. If the content of the conductive material is less than 0.1 parts by weight, a usage effect of the conductive material is negligible. The present invention is not limited to a specific maximum limit of the content of the conductive material of the shell, however the content of the conductive material according to the present invention is in the typical range of preparing the cathode active material. When the content of the conductive material is in such a range, even though the conductive material is used in a relatively excessive amount, a conductive material left over after coating exits on the surface of the cathode active material and eliminates the need for an additional amount when preparing a slurry, thereby reducing the time spent in preparing the slurry. In consideration of improvement in the conductivity of electrically inactive second shell forming materials, the content of the conductive material of the second shell may be 10 parts by weight or less, preferably 5 parts by weight or less, more preferably 1 part by weight or less, however the present invention is not limited in this regard.

After the coating process for forming the second shell is completed, thermal treatment starts. The thermal treatment conditions may be equal or similar to the step (S2). And, the same thermal treatment effect as the step (S2) may be expected. However, the thermal treatment is preferably performed under an inert atmosphere to prevent oxidation of the olivine-type lithium iron phosphate.

The cathode active material of a lithium secondary battery, prepared by the above-mentioned method according to the present invention, may be adhered to at least one surface of a cathode current collector using a binder resin to form a cathode of the lithium secondary battery. The binder resin and cathode current collector may include, without limitations, all typical binder resins and cathode current collectors used in the prior art.

And, a cathode of a lithium secondary battery according to the present invention may be used in manufacturing the lithium secondary battery comprising an anode, a separator interposed between the anode and the cathode, and an electrolyte. The anode, separator and electrolyte may include, without limitations, all typical anodes, separators and electrolytes used in the prior art.

Hereinafter, the preferred embodiments of the present invention are described in more detail with reference to the examples and accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

Example 1

Formation of Lithium Composite Metal Oxide Core

Nickel sulfate ($NiSO_4 \cdot 6H_2O$), manganese sulfate ($MnSO_4 \cdot H_2O$) and cobalt sulfate ($CoSO_4 \cdot 7H_2O$) were dissolved in a purified ion-exchanged water with a mole ratio of nickel, cobalt and manganese being 0.4:0.3:0.3 to prepare an aqueous metal solution. And, an aqueous sodium hydroxide solution and an aqueous ammonia solution were prepared.

The aqueous metal solution and the aqueous ammonia solution were put at the speed of 5 L/hr and 0.5 L/hr, respectively, in a coprecipitation reactor, of which pH is 11.0 and rotation rate was 400 rpm under an inert nitrogen atmosphere using a metering pump. The aqueous sodium hydroxide solution was intermittently put in the coprecipitation reactor such that the pH of the mixed solution in the reactor was uniformly maintained at 11.0.

The reaction was performed for 48 hours or longer to obtain a slurry containing composite metal hydroxide of uniform size. The slurry was washed and filtered using a centrifugal separation filter until the pH of the filtered solution is 9.0 or less, and the obtained composite metal hydroxide powder was dried at 120° C. for 24 hours or longer to produce composite metal hydroxide.

Next, for a precise Stoichiometric ratio with a lithium salt, the composite metal hydroxide was thermally treated at 300° C. or higher for 12 hours or longer, and was mixed with the lithium salt with Stoichiometric ratio of 1:1.1. The mixture was sintered in a high temperature furnace with a temperature control function at 950° C. for 24 hours and at 500° C. for 24 hours. Then, grinding and classification were performed to produce lithium composite metal oxide having an Ni:Co:Mn ratio of 0.40:0.30:0.30 and an average particle size $D_{50}$ of 9.8 μm (micrometer).

<Coating of First Shell—Preparation of First Cathode Active Material>

A core-shell cathode active material was prepared using the obtained lithium composite metal oxide as a core, and as coating materials, barium titanate powder having an average particle size $D_{50}$ of 220 nm and titanium dioxide powder having an average particle size $D_{50}$ of 20 nm. 6 g barium titanate and 0.6 g titanium dioxide were mixed with 600 g of the lithium composite metal oxide using a dry coating system (Hosokawa micron Ltd., Japan) at such a mixing ratio by weight that the barium titanate and the titanium dioxide corresponding to a shell are 1 part by weight and 0.1 parts by weight based on 100 parts by weight of the core, respectively. Then, the mixture was treated with a rotation rate of 2700 rpm for 3 minutes and thermally treated at 500° C. for 4 hours to prepare a core-shell type first cathode active material having a first shell.

<Coating of Second Shell—Preparation of Second Cathode Active Material>

A core-shell cathode active material was prepared using the obtained core-shell cathode active material having the first shell, and as coating materials, olivine-type lithium iron phosphate powder having an average particle size $D_{50}$ of 200 nm and conductive carbon powder having an average particle size $D_{50}$ of 500 nm. 9 g olivine-type lithium iron phosphate and 1.2 g conductive carbon were mixed with 600 g of the core-shell cathode active material having the first shell at such a mixing ratio by weight that the olivine-type lithium iron phosphate and the conductive carbon corresponding to a second shell are 1.5 parts by weight and 0.2 parts by weight based on 100 parts by weight of the core-shell cathode active material having the first shell, respectively. Then, the mixture was treated in the same way as the first shell to prepare a core-shell type second cathode active material having a second shell.

Example 2

A core-shell cathode active material was prepared by the same method as that of example 1, except that an Ni:Co:Mn ratio of a lithium composite metal oxide was 0.50:0.20:0.30.

Comparative Examples 1 and 2

Cathode active materials of comparative examples 1 and 2 were prepared solely with the lithium composite metal oxide cores of examples 1 and 2, respectively.

Comparative Example 3

A cathode active material was prepared as a first cathode active material having solely the first shell of example 1.

Comparative Example 4

A cathode active material was prepared in the same way as example 1, except that the lithium composite metal oxide core of example 1 was coated with the second shell forming material of example 1 to form a first shell.

Comparative Example 5

A core-shell cathode active material was prepared in the same way as example 1, except that the lithium composite metal oxide core of example 1 was coated with the second shell forming material of example 1 to form a first shell and then coated with the first shell forming material of example 1 to form a second shell.

Characteristics Evaluation

1. Coating Characteristics

Figure 1B:
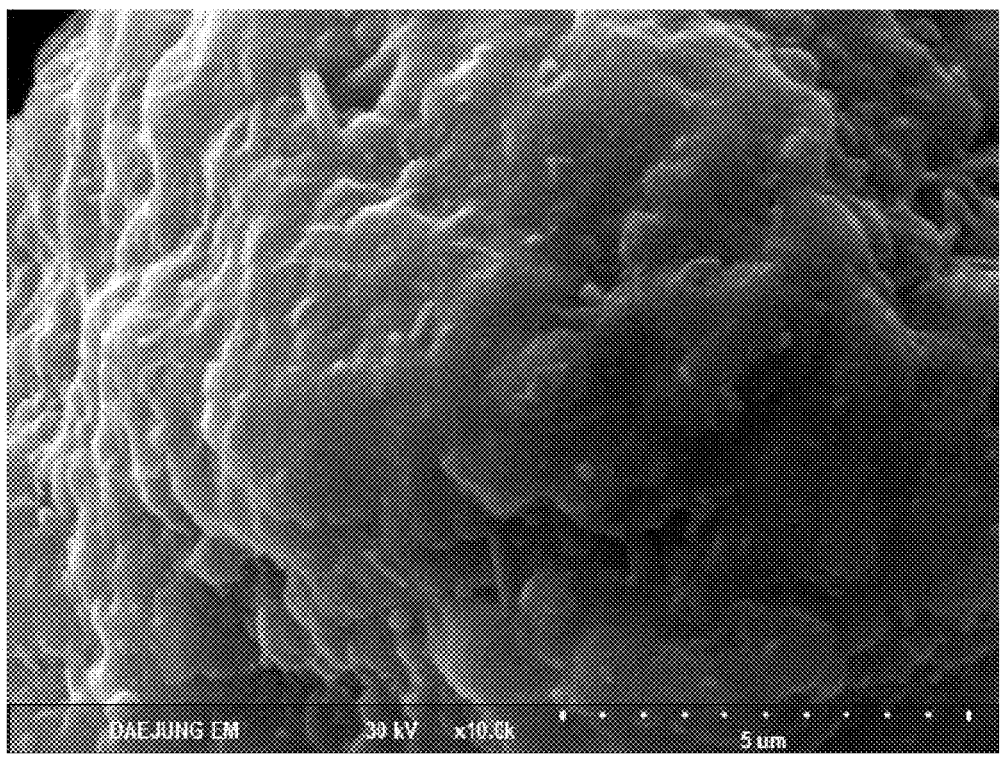
Figure 1C:
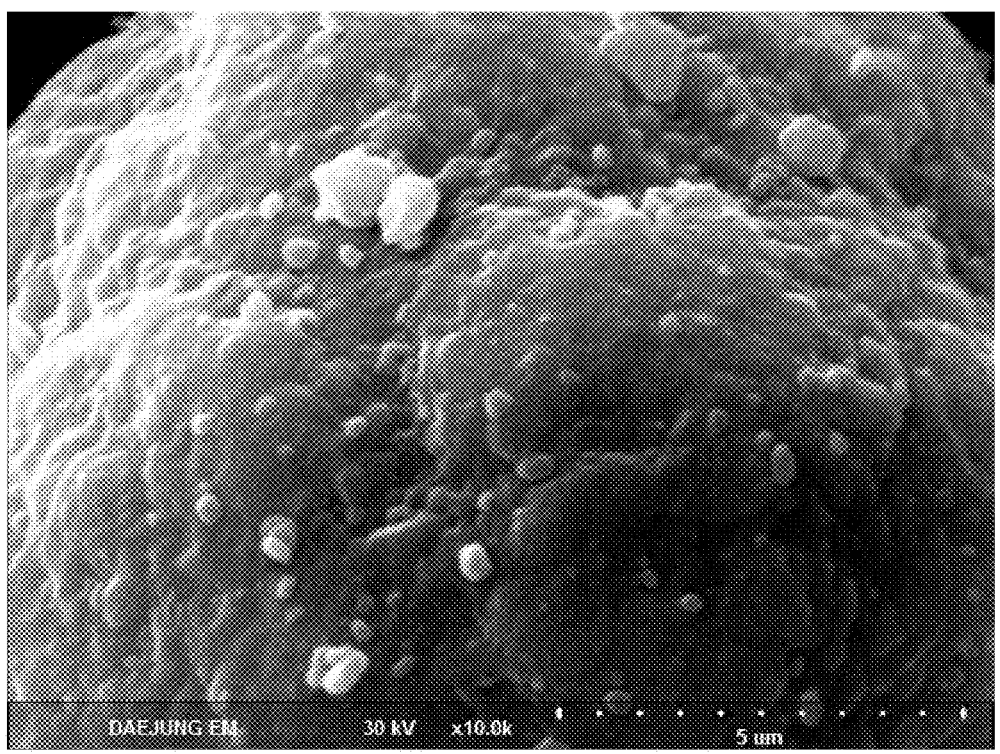

To check the shape and surface characteristics of the core-shell type cathode active material obtained in example 1, SEM (HP, 8564E) surface images of the core (a), the first shell (b) and the second shell are shown in FIG. 1.

As shown in FIG. 1, the cathode active material of the present invention has a good surface shape. That is, the core of the cathode active material is uniformly coated with a shell forming material, so that the gap between particles on the surface of the core of the cathode active material is filled with the shell forming material.

Figure 2:
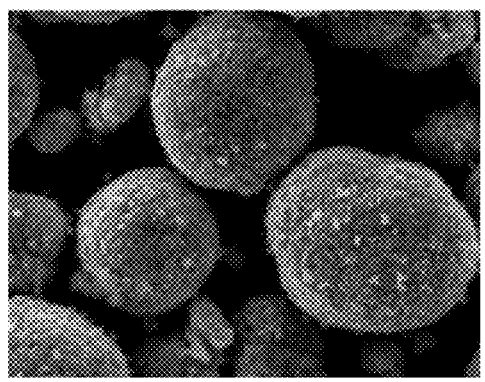
FIG. 2 is a particle map SEM image of the cathode active material of example 1 according to the present invention (a: Mapping image, b: Fe mapping, c: Ti mapping, d: C mapping).
Figure 2:
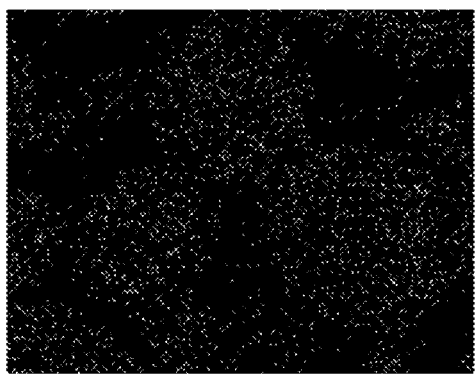
Figure 2:
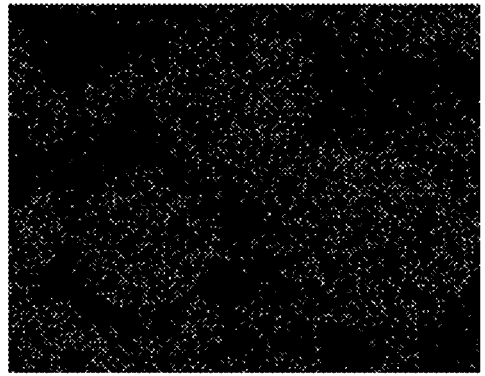
Figure 2:
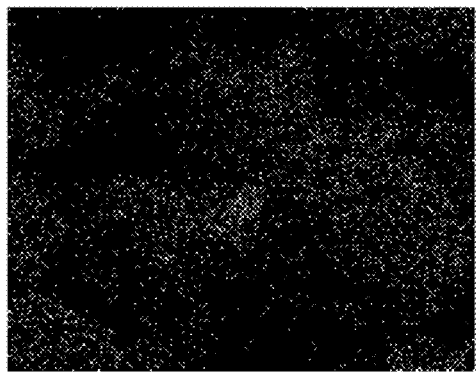

And, a mapping image of each element of the core-shell cathode active material obtained in example 1 is shown in FIG. 2 (a: Mapping image, b: Fe mapping, c: Ti mapping, d: C mapping).

As shown in FIG. 2, the elements of the shell are uniformly distributed.

2. Powder Characteristics

The average particle size and tap density of the cathode active materials according to the examples and comparative examples were measured before and after coating, and measurement results are shown in Table 1.

The average particle size was measured using a particle size analysis system (Malvern Instruments, Mastersizer 2000E). The average particle size $D_{50}$ was measured using a laser diffraction technology while particles were dispersed using ultrasonic waves. The tap density was determined from a change in volume before and after 500 times of strokes using 100 ml mass cylinder.

TABLE 1

| Classification | Core of cathode active material | | First coating (First shell) | | Second coating (Second shell) | |
|---|---|---|---|---|---|---|
| | $D_{50}$ micrometer | g/cc | $D_{50}$ micrometer | g/cc | $D_{50}$ micrometer | g/cc |
| Example 1 | 9.83 | 2.49 | 9.62 | 2.58 | 9.64 | 2.59 |
| Example 2 | 9.66 | 2.48 | 9.54 | 2.56 | 9.55 | 2.55 |
| Comparative example 1 | 9.83 | 2.49 | X | | X | |
| Comparative example 2 | 9.66 | 2.48 | X | | X | |
| Comparative example 3 | 9.83 | 2.49 | 9.62 | 2.58 | X | |
| Comparative example 4 | 9.83 | 2.49 | 9.72 | 2.54 | X | |
| Comparative example 5 | 9.83 | 2.49 | 9.72 | 2.54 | 9.65 | 2.43 |

As shown in Table 1, when compared with a cathode active material without a shell (comparative examples 1 and 2), a cathode active material with a shell (examples 1 and 2 and comparative examples 3 to 5) has a reduction in the average particle size and an increase in the tap density due to the sphericity and disintegration effects obtained by the first coating.

And, in the cathode active material of comparative example 5 obtained by coating the core with olivine-type lithium iron phosphate particles to form a first shell, and then coating with nano barium titanate particles and titanium dioxide particles to form a second shell, the olivine-type lithium iron phosphate particles of the first shell were separated from the core during the second coating process for forming the second shell. As a result, the first shell was not completely maintained and fine particles were generated. The cathode active material of comparative example 5 had a reduction in the powder characteristics.

Figure 3:
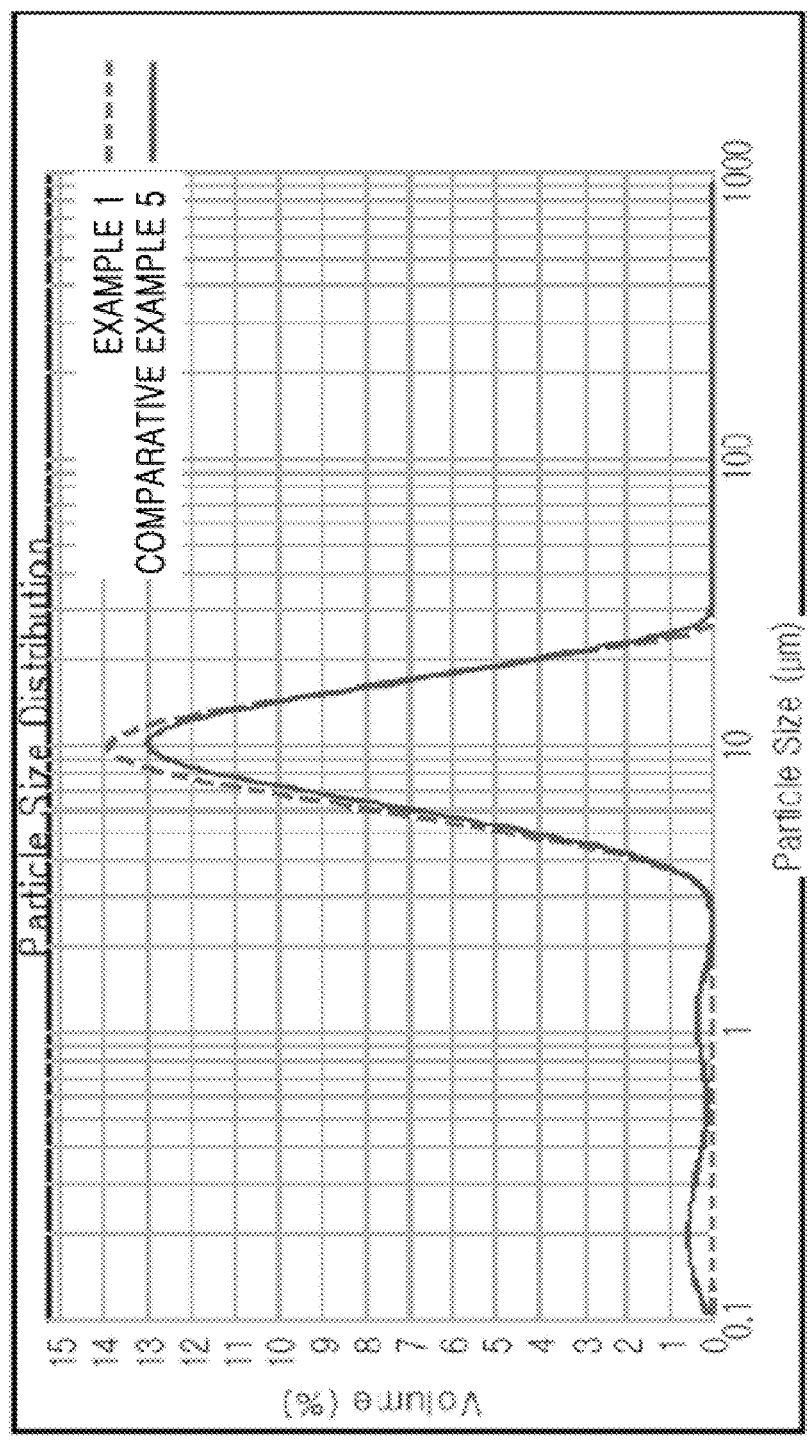
FIG. 3 is a graph illustrating the particle size distribution of cathode active material powder of example 1 and comparative example 5.

The particle size distribution of example 1 and comparative 5 is shown in FIG. 3, on which fine particles of comparative example 5 can be checked.

3. Electrochemical Characteristics (1) Half Cell Evaluation

To evaluate initial specific capacity and initial efficiency of the cathode active materials obtained in examples 1 and 2 and comparative examples 1 to 5, a slurry was prepared by mixing a cathode active material with an NMP (N-methylpyrrolidone) solution, in which a teflonized acetylene black as a conductive material and PVDF (polyvinylidene fluoride) as a binder material are dissolved. A mass ratio between the cathode active material, conductive material and binder material was 90:5:5. The slurry was applied on a 30 μm (micrometer) Al current collector, dried, compressed to a uniform thickness, and punched as a 13 mm diameter cathode.

A 2032 coin cell was manufactured using the cathode, a lithium foil as an anode and a 20 μm (micrometer) thickness separator interposed between the cathode and the anode. At this time, $LiPF_6$ solution (1.2 M) containing a mixed solvent of ethylene carbonate and diethyl carbonate (volume ratio 1:3) was used as an electrolyte. A charge/discharge experiment was made on the cell at 25° C. in a voltage range of 2.5 to 4.2V with a current density of 0.2 C using a charge/discharge cycle system under constant current-constant voltage charge conditions (0.02 C at the end of charge) and constant current discharge conditions to measure the charge capacity and discharge capacity, and the measurement results are shown in Table 2.

Graphite was used as an anode, a separator was interposed between the anode and the cathode such that the cathode and the anode were placed opposite to each other, a 113 μm thickness aluminum was applied as an exterior material, and the constituent elements were sealed in a globe box of an argon atmosphere and compressed by heat to manufacture a pouch cell. The cell had a size of 60 mm thick×216 mm wide×216 mm long and a design capacity of 25 Ah.

1) Evaluation of High Rate Capability and Thermal Stability

The cell was initially charged and discharged using a charge/discharge cycle system at 25° C. in a voltage range of 3.0 to 4.2V with a current density of 0.2 C (5 h), and then charged and discharged with various current densities. The high rate capability was evaluated from a ratio of a discharge capacity at a current density of 15 C to a discharge capacity at a current density of 0.5 C as a reference capacity. The high rate capability of examples and comparative examples is shown in Table 3.

And, to evaluation the thermal stability of the cathode active materials obtained in examples and comparative examples, a cell of the same standard was fully charged at 4.2V and stored in a hot box of 150° C. for 3 hours. After storage, the cell was observed for swelling, fire and explosion, and the results are shown in Table 3. After storage in a hot box for 3 hours, if the cell was swollen, it was evaluated that the cell did "pass" the thermal stability test, and if the cell was burned or exploded, it was evaluated that the cell did "fail" the thermal stability test.

TABLE 2

| Classification | $1^{st}$ 0.2C charge capacity (mAh/g) | $1^{st}$ 0.2C discharge capacity (mAh/g) | $1^{st}$ efficiency (%) | $1^{st}$ irreversible capacity (mAh/g) | Constant-voltage charge rate (%) |
|---|---|---|---|---|---|
| Example 1 | 167.4 | 150.1 | 89.6 | 17.3 | 0.9 |
| Example 2 | 171.7 | 154.7 | 90.0 | 17.0 | 0.8 |
| Comparative example 1 | 168.2 | 150.3 | 89.3 | 17.9 | 0.9 |
| Comparative example 2 | 172.5 | 154.8 | 89.7 | 17.7 | 1.0 |
| Comparative example 3 | 166.3 | 149.5 | 89.8 | 16.8 | 0.8 |
| Comparative example 4 | 166.5 | 149.7 | 89.9 | 16.8 | 0.9 |
| Comparative example 5 | 165.7 | 148.3 | 89.0 | 17.4 | 1.2 |

Referring to Table 2, it is found that the cathode active materials with a double coating layer according to the present invention have similar electrical characteristics to the cathode active materials of comparative examples without any coating layer or with a single coating layer.

(2) Full Cell Evaluation

<Manufacture of Cell>

To evaluate the high rate capability, high-temperature durability and safety of the cathode active materials obtained in the examples 1 and 2 and comparative examples 1 to 5, a cell was manufactured. First, a slurry was prepared by mixing a cathode active material with an NMP solution, in which carbon as a conductive material and PVDF as a binder material are dissolved. A mass ratio between the cathode active material, conductive material and binder material was 92:4:4.

TABLE 3

| Classification | 15 C discharge characteristics (@0.5 C., %) | Thermal stability test result |
|---|---|---|
| Example 1 | 87.2 | Pass |
| Example 2 | 89.3 | Pass |
| Comparative example 1 | 90.1 | Fail |
| Comparative example 2 | 90.5 | Fail |
| Comparative example 3 | 89.6 | Pass |
| Comparative example 4 | 88.5 | Fail |
| Comparative example 5 | 86.3 | Fail |

Referring to Table 3, it is found that because the examples of the present invention have a double coating layer, they have a slight reduction in high rate capability, but an improvement in thermal stability when compared with the comparative examples.

2) Evaluation of High-Temperature Durability

To evaluate the high-temperature durability, a cell was fully charged at 4.2V and stored in a high-temperature oven of 60° C. for 2 weeks, and the retention capacity and recovery capacity before and after storage were evaluated. The evaluation results are shown in Table 4. The retention capacity and recovery capacity were evaluated on the basis that the discharge capacity before storage is 100%.

TABLE 4

|  | Before storage | Retention capacity(Ah) | | Recovery capacity(Ah) | |
| --- | --- | --- | --- | --- | --- |
|  | Capacity (Ah) | Capacity (Ah) | % | Capacity (Ah) | % |
| Example 1 | 25.7 | 22.5 | 87.8 | 24.4 | 95.3 |
| Example 2 | 25.6 | 22.3 | 87.4 | 24.6 | 96.2 |
| Comparative example 1 | 25.4 | 20.5 | 81.0 | 22.7 | 89.4 |
| Comparative example 2 | 25.7 | 21.0 | 82.1 | 23.4 | 91.2 |
| Comparative example 3 | 25.3 | 21.2 | 84.0 | 23.5 | 93.2 |
| Comparative example 4 | 25.6 | 21.3 | 83.3 | 23.7 | 92.6 |
| Comparative example 5 | 25.5 | 21.3 | 83.4 | 23.7 | 92.8 |

Referring to Table 4, it is found that the cells of examples have better high-temperature durability than those of comparative examples. It is judged that this result is caused by the minimized contact between a core and an electrolyte due to the double-layered shell structure of the present invention.

3) Evaluation of Overcharge Safety

To evaluate the overcharge safety of the cathode active materials obtained in examples 1 and 2 and comparative examples 1 to 5, a cell of the same standard was charged 250% or more with a current density of 1 C (25 Ah), and 12V overcharge characteristics were evaluated. The evaluation results are shown in Table 5.

TABLE 5

|  | Test results | | | |
| --- | --- | --- | --- | --- |
| Classification | A | B | C | D |
| Example 1 | ○ |  |  |  |
| Example 2 | ○ |  |  |  |
| Comparative example 1 |  |  | ○ | ○ |
| Comparative example 2 |  |  | ○ | ○ |
| Comparative example 3 |  |  | ○ |  |
| Comparative example 4 |  | ○ | ○ |  |
| Comparative example 5 |  | ○ | ○ |  |

A: no change, B: smoke, C: fire, D: explosion

Referring to Table 5, it is found that the examples 1 and 2 and comparative examples 4 and 5 using olivine-type lithium iron phosphate as a shell forming material have the improved safety after overcharge when compared with the comparative examples 1 to 3. In particular, it is found that the examples 1 and 2 comprising a first shell formed from barium titanate and metal oxide exhibit the best characteristics. Accordingly, the cathode active material of the present invention has excellent overcharge safety, and thus is suitable for a high-capacity battery.

The cathode active material for lithium secondary batteries has a double-layered shell structure formed from different materials on lithium metal hydroxide, and can improve safety, especially thermal stability, high-temperature durability and overcharge safety while favorably maintaining the basic electrical characteristics of the lithium secondary batteries.

And, the method of preparing a cathode active material according to the present invention allows preparation of the cathode active material of the present invention with excellent reproducibility and productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode active material for lithium secondary batteries, comprising:
   a core formed by aggregation of a plurality of lithium metal oxide primary particles;
   a first shell formed by coating the surface of the core with a plurality of barium titanate particles and a plurality of metal oxide particles; and
   a second shell formed by coating the surface of the first shell with a plurality of olivine-type lithium iron phosphate particles and a plurality of conductive material particles,
   wherein the metal oxide particles have such an average particle size that the metal oxide particles are disposed in the gap between the barium titanate particles, and the metal oxide particles fill the gap between the barium titanate particles,
   wherein the second shell is coated on the surface of the first shell in the form of a film,
   wherein the lithium metal oxide primary particles of the core is any one selected from the group consisting of $LiCoO_2$, $Li(Ni_aCo_bAl_c)O_2$ ($0<a<1$, $0<b<1$, $0<c<1$, $a+b+c=1$), $Li(Ni_aCo_bMn_c)O_2$ ($0<a<1$, $0<b<1$, $0<c<1$, $a+b+c=1$), $Li(Li_xNi_aCo_bMn_c)O_2$ ($0<x<0.5$, $0<a<1$, $0<b<1$, $0<c<1$, $a+b+c=1$) and $LiMn_2O_4$, or mixtures thereof,
   wherein the metal oxide particles of the first shell is any one selected from the group consisting of titanium oxide, yttrium oxide, magnesium oxide, zinc oxide and lithium metal oxide, or mixtures thereof,
   wherein the conductive material particles of the second shell is any one selected from the group consisting of conductive polymers and conductive carbon, or mixtures thereof.

2. A cathode active material for lithium secondary batteries, comprising:
   a core comprising an aggregation of a plurality of lithium metal oxide primary particles, the lithium metal oxide primary particles selected from the group consisting of $LiCoO_2$, $Li(Ni_aCo_bAl_c)O_2$ ($0<a<1$, $0<b<1$, $0<c<1$, $a+b+c=1$), $Li(Ni_aCo_bMn_c)O_2$ ($0<a<1$, $0<b<1$, $0<c<1$, $a+b+c=1$), $Li(Li_xNi_aCo_bMn_c)O_2$ ($0<x<0.5$, $0<a<1$, $0<b<1$, $0<c<1$, $a+b+c=1$) and $LiMn_2O_4$, or mixtures thereof;
   a first shell coating the entire surface of the core, the first shell comprising a plurality of barium titanate particles and a plurality of metal oxide particles, wherein the metal oxide particles are selected from the group consisting of titanium oxide, yttrium oxide, magnesium oxide, zinc oxide and lithium metal oxide, or mixtures thereof; and a second shell coating the entire surface of the first shell, the second shell comprising a plurality of olivine-type lithium iron phosphate particles and a plurality of conductive material particles, wherein the conductive material particles are selected from the group consisting of conductive polymers and conductive carbon, or mixtures thereof.

3. The cathode active material of claim 2, wherein the first shell uniformly coats the surface of the core.

4. The cathode active material of claim 2, wherein the first shell fills any gaps between the primary particles forming the core.

* * * * *